United States Patent
Jeong

(10) Patent No.: US 10,358,115 B2
(45) Date of Patent: Jul. 23, 2019

(54) VEHICLE, VEHICLE SECURITY SYSTEM AND VEHICLE SECURITY METHOD

(71) Applicants: Hyundai Motor Company, Seoul (KR); Kia Motors Corporation, Seoul (KR)

(72) Inventor: Yongseok Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/826,210

(22) Filed: Nov. 29, 2017

(65) Prior Publication Data

US 2019/0118768 A1    Apr. 25, 2019

(30) Foreign Application Priority Data

Oct. 23, 2017  (KR) .......................... 10-2017-0137021

(51) Int. Cl.
 B60R 25/10 (2013.01)
 B60R 25/24 (2013.01)
 B60R 25/33 (2013.01)

(52) U.S. Cl.
 CPC .............. B60R 25/24 (2013.01); B60R 25/33 (2013.01); *B60R 2325/205* (2013.01)

(58) Field of Classification Search
 CPC .... B60R 25/24; B60R 25/33; B60R 2325/205
 USPC ..................................................... 340/426.36
 See application file for complete search history.

(56) References Cited

U.S. PATENT DOCUMENTS

| | | | | |
|---|---|---|---|---|
| 6,407,698 | B1* | 6/2002 | Ayed ....................... | G01S 1/047 342/357.31 |
| 6,670,883 | B1* | 12/2003 | Asakura .................. | B60R 25/24 307/10.1 |
| 6,734,790 | B1* | 5/2004 | Hodger ................. | B60R 25/102 307/10.2 |
| 2002/0130554 | A1* | 9/2002 | Banas ..................... | B60R 25/04 307/10.3 |

(Continued)

FOREIGN PATENT DOCUMENTS

JP    2007-099173 A    4/2007
JP    2012-191532 A    10/2012

(Continued)

*Primary Examiner* — Zhen Y Wu
(74) *Attorney, Agent, or Firm* — Mintz Levin Cohn Ferris Glovsky and Popeo, P.C.; Peter F. Corless

(57) ABSTRACT

A vehicle security system may include: a mobile communication terminal; and a vehicle configured to transmit vehicle global positioning system (GPS) information to the mobile communication terminal when power of the vehicle is switched off, activate a security mode when a remote movement notification is received from the mobile communication terminal, and block remote vehicle manipulation via a near-field communication terminal when the security mode is activated. The mobile communication terminal is registered with the vehicle and is configured to determine a location of the vehicle based on the vehicle GPS information, and transmit the remote movement notification to the vehicle when the mobile communication terminal moves beyond a predetermined distance from the location of the vehicle.

18 Claims, 7 Drawing Sheets

(56) References Cited

U.S. PATENT DOCUMENTS

| | | | |
|---|---|---|---|
| 2005/0151624 A1* | 7/2005 | Qualich | G05B 19/0428 340/5.72 |
| 2005/0237166 A1* | 10/2005 | Chen | B60R 25/1003 340/426.13 |
| 2007/0085658 A1* | 4/2007 | King | B60R 25/24 340/5.72 |
| 2009/0048778 A1* | 2/2009 | Borkowicz | B60R 25/33 701/469 |
| 2009/0079591 A1* | 3/2009 | Motoyama | G08G 1/205 340/991 |
| 2010/0114488 A1* | 5/2010 | Khamharn | B60R 25/102 701/300 |
| 2013/0147616 A1* | 6/2013 | Lambert | G07C 5/008 340/426.1 |
| 2014/0114503 A1* | 4/2014 | Ghabra | H04Q 9/00 701/2 |
| 2014/0218529 A1* | 8/2014 | Mahmoud | H04N 7/181 348/148 |
| 2014/0232569 A1* | 8/2014 | Skinder | G01C 21/16 340/989 |
| 2015/0099552 A1* | 4/2015 | Chen | H04W 4/029 455/457 |
| 2015/0210249 A1* | 7/2015 | Morris | B60R 25/24 701/1 |
| 2015/0308396 A1* | 10/2015 | Elzein | F02N 11/0807 455/420 |
| 2015/0356797 A1* | 12/2015 | McBride | G07C 9/00119 340/5.61 |
| 2016/0209218 A1* | 7/2016 | Lacher | G01C 21/26 |
| 2016/0300417 A1* | 10/2016 | Hatton | G07C 9/00857 |
| 2017/0032593 A1* | 2/2017 | Patel | G07C 9/00309 |
| 2018/0009416 A1* | 1/2018 | Maiwand | G07C 9/00182 |
| 2018/0056936 A1* | 3/2018 | Parasurama | B60R 25/245 |
| 2018/0056939 A1* | 3/2018 | van Roermund | B60R 25/04 |
| 2018/0077536 A1* | 3/2018 | Lai | H04W 4/70 |
| 2018/0245559 A1* | 8/2018 | Kang | F02N 11/0807 |
| 2018/0361991 A1* | 12/2018 | Mitsubayashi | B60R 25/24 |
| 2019/0039570 A1* | 2/2019 | Foster | B60R 25/25 |
| 2019/0080539 A1* | 3/2019 | Yoshikawa | B60R 25/24 |

FOREIGN PATENT DOCUMENTS

| | | |
|---|---|---|
| JP | 2014-094680 A | 5/2014 |
| KR | 2009-0008885 A | 1/2009 |
| KR | 2010-0019598 A | 2/2010 |
| KR | 2012-0124334 A | 11/2012 |
| KR | 2013-0000890 A | 1/2013 |
| KR | 2013-0117426 A | 10/2013 |
| WO | 2016/093541 A1 | 6/2016 |

* cited by examiner

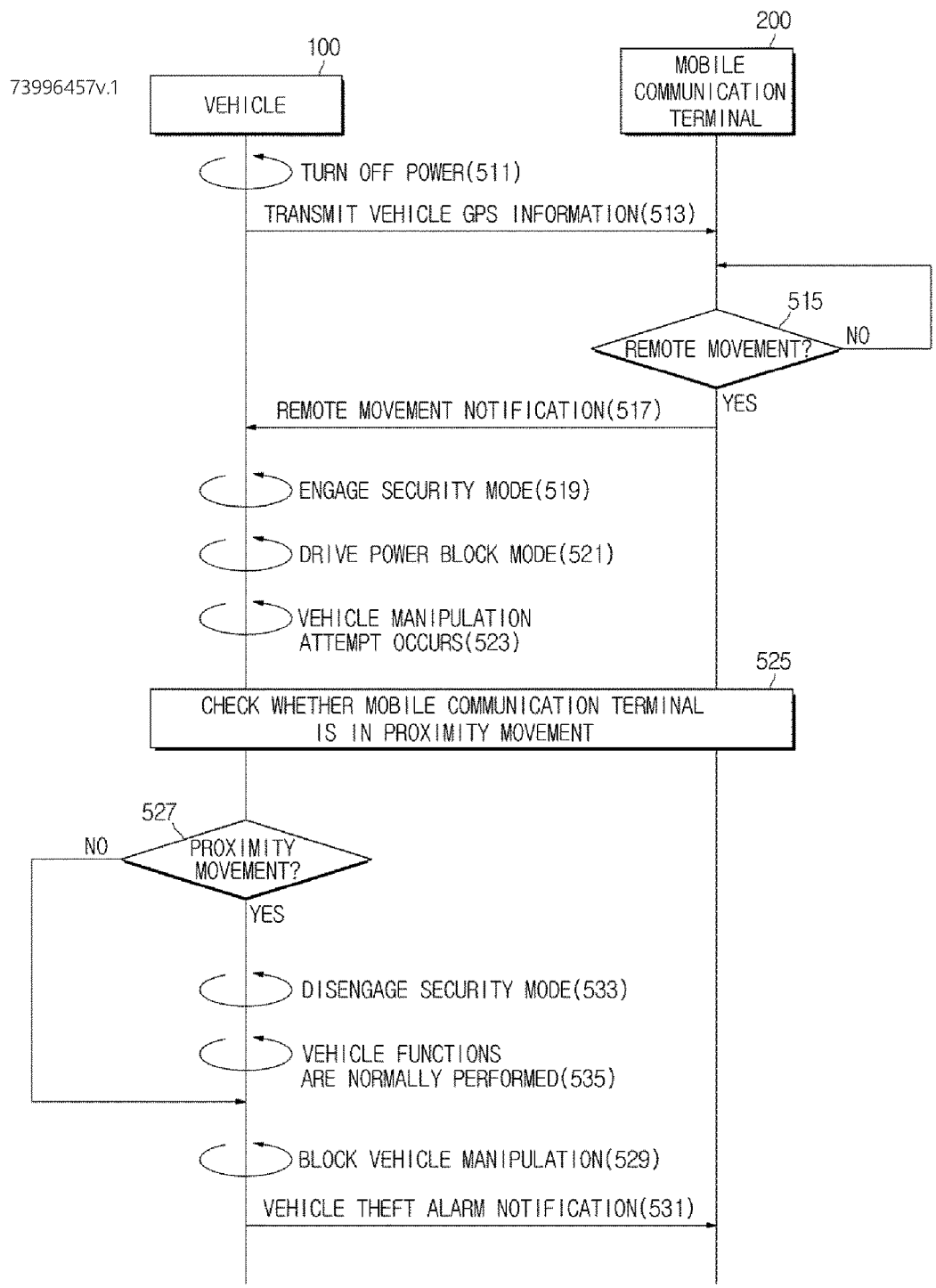

VEHICLE, VEHICLE SECURITY SYSTEM AND VEHICLE SECURITY METHOD

CROSS-REFERENCE TO RELATED APPLICATION

This application claims the benefit of priority to Korean Patent Application No. 10-2017-0137021, filed on Oct. 23, 2017 in the Korean Intellectual Property Office, the disclosure of which is incorporated herein by reference in its entirety as if fully set forth herein.

BACKGROUND

1. Technical Field

Embodiments of the present disclosure relate generally to vehicular technologies and, more particularly, to a vehicle security system and a vehicle security method.

2. Description of the Related Art

Various aftermarket devices have been developed for installation in vehicles for the purpose of enhancing convenience and safety of the driver. Such devices may include, for example, an auxiliary safety device (e.g., a lane departure warning device configured to prevent deviation from a driving lane by assisting the driver in operating a steering wheel when the vehicle is driven on a road) and a navigation device configured to map a route to a destination selected by the driver and to provide peripheral information related to the route.

In addition, a smart key is often provided for convenience functions such as door opening, trunk opening, and vehicle starting. However, it is possible for somebody other than the driver to manipulate or steal the vehicle by amplifying transmitted and received signals between the vehicle and the smart key. Even when identification information (e.g., an encrypted vehicle identification number (VIN) code and/or a serial number of the smart key) is used between the vehicle and the smart key, the vehicle is still vulnerable to theft in the above-mentioned manner.

SUMMARY

It is an aspect of the present disclosure to provide a vehicle, a vehicle security system and a vehicle security method for detecting an attempt to steal the vehicle and for preventing unnecessary power consumption in the vehicle by utilizing global positioning system (GPS) information of a mobile communication terminal.

Additional aspects of the disclosure will be set forth in part in the description which follows and, in part, will be apparent from the description, or may be learned by practice of the disclosure.

In accordance with embodiments of the present disclosure, a vehicle security system include: a mobile communication terminal; and a vehicle configured to transmit vehicle global positioning system (GPS) information to the mobile communication terminal when power of the vehicle is switched off, activate a security mode when a remote movement notification is received from the mobile communication terminal, and block remote vehicle manipulation via a near-field communication terminal when the security mode is activated. The mobile communication terminal is registered with the vehicle and is configured to determine a location of the vehicle based on the vehicle GPS information, and transmit the remote movement notification to the vehicle when the mobile communication terminal moves beyond a predetermined distance from the location of the vehicle.

When the vehicle receives an authentication response signal from the near-field communication terminal, the vehicle may continue to block the remote vehicle manipulation when the security mode is activated.

The vehicle may block power to one or more predetermined components in the vehicle by activating a power block mode when the security mode is activated.

When the power block mode is activated, the vehicle may block power for detecting near-field communication signals transmitted from the near-field communication terminal and the mobile communication terminal.

When an attempt to manipulate the vehicle via the near-field communication terminal occurs during activation of the security mode, the vehicle may transmit a vehicle theft alarm notification to the mobile communication terminal.

Upon receiving a proximity movement notification from the mobile communication terminal, the vehicle may deactivate the security mode.

The vehicle may be further configured to transmit an authentication signal for remote manipulation of the vehicle to the mobile communication terminal when an attempt to manipulate the vehicle via the near-field communication terminal occurs; deactivate the security mode to allow the remote manipulation of the vehicle when an intensity of an authentication response signal received from the mobile communication terminal is greater than or equal to a reference value; and block the remote manipulation of the vehicle by keeping the security mode activated when the intensity of the authentication response signal is less than the reference value.

The vehicle may be further configured to compare GPS coordinates of the vehicle with GPS coordinates of the mobile communication terminal when an attempt to remotely manipulate the vehicle via the near-field communication terminal occurs; deactivate the security mode to allow remote vehicle manipulation when a distance between the vehicle and the mobile communication terminal is less than a predetermined distance; and block the remote vehicle manipulation by keeping the security mode activated when the distance between the vehicle and the mobile communication terminal exceeds the predetermined distance.

The near-field communication terminal may perform remote vehicle manipulation of the vehicle including at least one of door opening, trunk opening, and a remote start of the vehicle.

Furthermore, in accordance with embodiments of the present disclosure, a vehicle includes: a communicator; a GPS receiver configured to acquire vehicle GPS information of the vehicle; and a controller configured to transmit the vehicle GPS information to a registered mobile communication terminal when power of the vehicle is switched off, activate a security mode when a remote movement notification is received from the mobile communication terminal, and block remote vehicle manipulation via a near-field communication terminal when the security mode is activated.

When the security mode is activated, the controller may activate a power block mode to block power to one or more predetermined components in the vehicle.

Furthermore, in accordance with embodiments of the present disclosure, a vehicle security method includes: transmitting, by a vehicle, vehicle GPS information to a registered mobile communication terminal when power of the vehicle is switched off; activating, by the vehicle, a security mode when the vehicle receives a remote movement notification from the mobile communication terminal; and blocking, by the vehicle, remote manipulation of the vehicle via a near-field communication terminal when the security mode is activated.

After activating the security mode and before blocking the manipulation of the vehicle, the vehicle security method may further include activating a power block mode to block power to one or more predetermined components in the vehicle when the security mode is activating.

When the power block mode is activated, power for detecting near-field communication signals transmitted from the near-field communication terminal and the mobile communication terminal may be blocked.

After blocking the remote manipulation of the vehicle, the vehicle security method may further include transmitting a vehicle theft alarm notification to the mobile communication terminal.

After activating the security mode, the vehicle security method may further include deactivating the security mode upon receiving a proximity movement notification from the mobile communication terminal.

The blocking of the remote manipulation of the vehicle in the vehicle security method may include: transmitting, by the vehicle, an authentication signal for remote manipulation of the vehicle to the mobile communication terminal when an attempt to remote manipulate the vehicle via the near-field communication terminal occurs; determining whether an intensity of an authentication response signal is greater than or equal to a reference value, the authentication response signal received from the mobile communication terminal; and blocking the remote manipulation of the vehicle when the intensity of the authentication response signal is less than the reference value.

The blocking of the remote manipulation of the vehicle in the vehicle security method may include: comparing, by the vehicle, GPS coordinates of the vehicle with GPS coordinates of the mobile communication terminal when an attempt to remotely manipulate the vehicle via the near-field communication terminal occurs; and blocking the remote manipulation of the vehicle by keeping the security mode activating when a distance between the vehicle and the mobile communication terminal exceeds a predetermined distance.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a flowchart for describing another example of a vehicle security method according to embodiments of the present disclosure.

Figure 1:
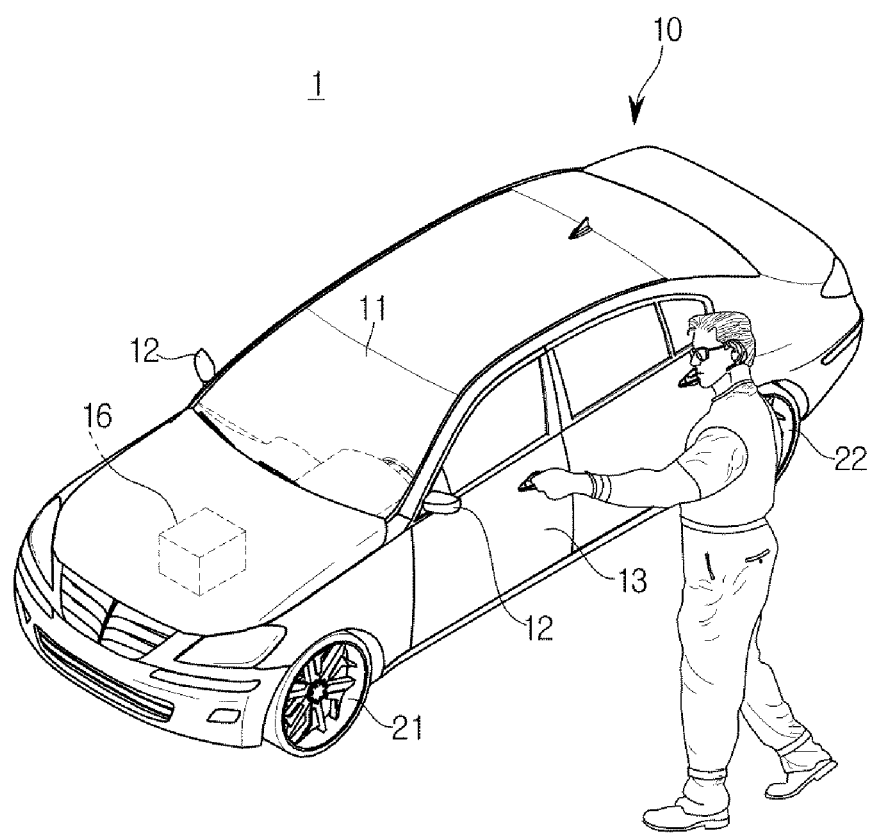
FIG. 1 is a view showing an exterior of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the embodiments of the present disclosure, examples of which are illustrated in the accompanying drawings, wherein like reference numerals refer to like elements throughout. The same reference numerals denote the same elements throughout the specification. All the elements of the embodiments are not described in the specification, and the general contents in the technical field to which the present disclosure pertains or the repeated contents in the embodiments will be omitted. The terms "unit, module, member, or block" used in the specification may be embodied in software or hardware, and a plurality of "units, modules, members, or blocks" may be embodied as one element according to the embodiments, or one "unit, module, member, or block" may include a plurality of elements.

Throughout the specification, when it is said that a part is "connected" to another part, it means that they are indirectly connected to each other as well as that they are directly connected to each other and the indirect connection includes connection through a wireless communication network. Further, when it is described that a part includes an element, it may mean that the part may further include second element without excluding the second element unless a special contradictory description is made.

The terms, such as first and second, are used to distinguish one element from others, and the elements are not limited by the terms. The terms of a singular form may include plural forms unless otherwise specified. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference numerals of operations are used for convenience of description, and the reference numerals do not indicate the sequence of the operations but the operations may be performed in a sequence that is different from the described sequence unless a specific sequence is clearly described in the context.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Hereinafter, an operation principle and embodiments of the present disclosure will be described with reference to the accompanying drawings.

FIG. 1 is a view showing an exterior of a vehicle according to embodiments of the present disclosure.

As shown in FIG. 1, the exterior of a vehicle 1 may include a main body 10 configured to form the exterior of the vehicle 1, a windscreen 11 configured to provide a front visual field of the vehicle 1 to a driver, a side mirror 12 configured to provide a rear visual field of the vehicle 1 to the diver, a door 13 configured to shield an interior of the vehicle 1 from the outside, and wheels 21 and 22 configured to move the vehicle 1 including front wheels 21 positioned at the front of the vehicle and rear wheels 22 positioned at the rear of the vehicle.

The windscreen 11 is provided on an upper front side of the main body 10, so that the driver in the vehicle 1 can obtain visual information on what is in front of the vehicle 1. In addition, the side mirror 12 includes a left side mirror provided on a left side of the main body 10 and a right side mirror provided on a right side of the main body 10 so that the driver inside the vehicle 1 can obtain visual information what is beside and behind the vehicle 1.

The door 13 is rotatably provided on the left and right sides of the main body 10 so that the driver can ride inside the vehicle 1 upon opening the door and the inside of the vehicle 1 can be shielded from the outside upon closing the door.

In addition to the above-mentioned components, the vehicle 1 may include a power unit 16 configured to rotate the wheels 21 and 22, a steering (not shown) configured to change a moving direction of the vehicle 1, and a brake (not shown) configured to stop a motion of the wheels.

The power unit 16 provides a rotary force to the front wheels 21 or the rear wheels 22 to move the main body forward or backward. The above power unit 16 may include an engine configured to generate the rotary force by burning fossil fuel or a motor configured to generate the rotary force by receiving power from a capacitor (not shown).

The steering may include a steering wheel (42 in FIG. 2) configured to receive a driving direction input from the driver, a steering gear (not shown) configured to convert a rotational motion of the steering wheel 42 into a reciprocating motion, and a steering link (not shown) configured to transmit the reciprocating motion of the steering gear (not shown) to the front wheels 21. The above steering may change a driving direction of the vehicle 1 by changing a direction of a rotation shaft of the wheel.

The brake may include a brake pedal (not shown) configured to receive a braking manipulation from the driver, a brake drum (not shown) coupled to the wheels 21 and 22, and a brake shoe (not shown) configured to brake a rotation of the brake drum (not shown) using friction. The above brake may brake the vehicle 1 by stopping the rotation of the wheels 21 and 22.

It should be understood that the exterior of the vehicle 1 as described above and illustrated in FIG. 1 is provided merely for demonstration purposes, and thus does not limit the scope of the present disclosure.

Figure 2:
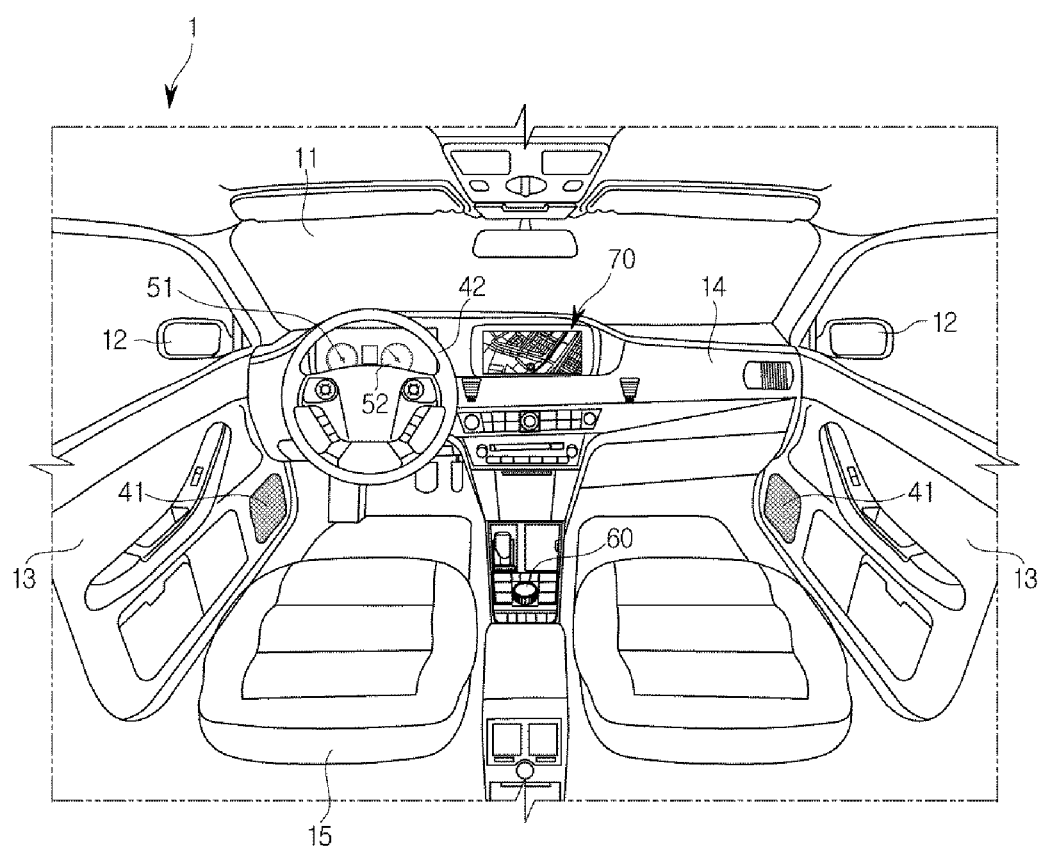
FIG. 2 is a view showing an interior of a vehicle according to embodiments of the present disclosure.

FIG. 2 is a view showing an interior of a vehicle according to embodiments of the present disclosure.

The interior of the vehicle 1 may include a dashboard 14 installed therein with various devices configured to allow the driver to manipulate the vehicle 1, a driver's seat 15 on which the driver of the vehicle 1 sits, cluster displays 51 and 52 configured to display operation information and the like of the vehicle 1, and a navigation 70 configured to provide audio and video functions as well as a route navigating function configured to provide route navigating information according to instruction by the driver.

The dashboard 14 protrudes from a lower portion of the windscreen 11 toward the driver, and enables the driver to use various devices installed in the dashboard 14 while looking forward.

The driver's seat 15 is provided behind the dashboard 14 to enable the driver to drive the vehicle 1 while looking in front of the vehicle 1 and at various devices of the dashboard 14 in a stable posture.

The cluster displays 51 and 52 are provided on the dashboard 14 facing the driver's seat 15, and may include a speedometer 51 configured to indicate the driving speed of the vehicle 1, and an rpm gauge 52 configured to indicate the rotational speed of the power unit (not shown).

The navigation 70 may include a display configured to display information about the road on which the vehicle 1 travels or about a route to a destination the driver wants to reach, and may include a speaker 41 configured to output a sound according to instruction by the driver. Lately, an audio video navigation (AVN) integrally formed of an audio device, a video device, and a navigation device tends to be installed in a vehicle.

The navigation 70 may be installed in a center fascia. Herein, the center fascia refers to a control panel portion, positioned between the driver's seat and a passenger seat, of the dashboard 14, and refers to a region where the dashboard 14 and a shift lever meet perpendicular to each other. An air conditioner, a heater controller, a vent, a cigar jack, an ashtray, and a cup holder as well as the navigation 70 may be installed in the center fascia.

In addition, the center fascia together with a center console may also serve to separate the driver's seat from the passenger seat.

In addition, to, the center fascia may be provided with an additional jog dial 60 for various operations in addition to the navigation 70.

Operations can be performed by rotating or pressing the jog dial 60 of the disclosure, or a touch pad having a touch recognition function may be provided to enable operation through handwriting recognition utilizing a user's finger or an additional tool having a touch recognition function.

It should be understood that the interior of the vehicle 1 as described above and illustrated in FIG. 2 is provided merely for demonstration purposes, and thus does not limit the scope of the present disclosure.

Figure 3:
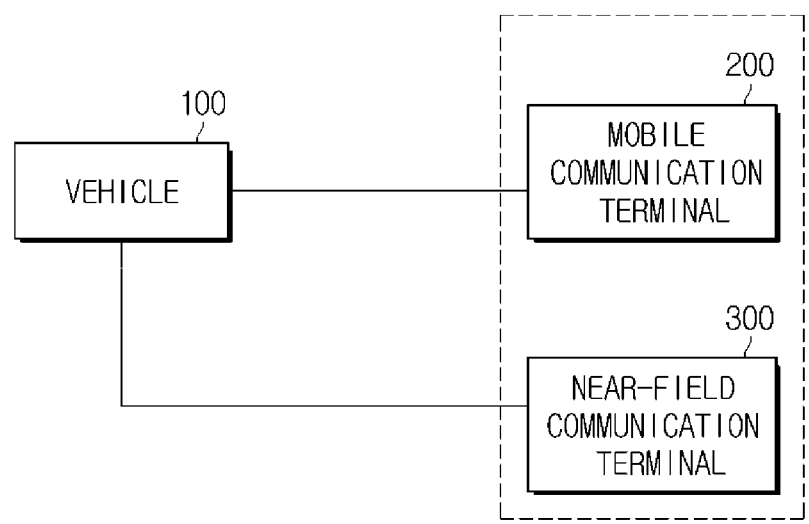
FIG. 3 is a control block diagram showing a configuration of a vehicle security system according to embodiments of the present disclosure.

FIG. 3 is a control block diagram showing a configuration of a vehicle security system according to embodiments of the present disclosure.

As shown in FIG. 3, the vehicle security system may include a vehicle 100 and a mobile communication terminal 200.

The vehicle 100 may transmit vehicle GPS information to a registered mobile communication terminal 200 when power of the vehicle 100 is switched off, activate the security mode when a remote movement notification is received from the mobile communication terminal 200, and block (i.e., disable) remote manipulation of the vehicle 100 via a near-field communication terminal 300 during activation of the security mode. The vehicle 100 may be equipped with a communication unit (not shown), as would be generally known in the art, for the purpose of transmitting the aforementioned GPS information. Thus, when transmissions are described herein as performed by the vehicle 100, for the sake of simplicity, it should be understood that such transmissions are performed by the communication unit of the vehicle. Similarly, when other actions are referred to herein as performed by the vehicle 100, it should be understood that such actions are performed by components equipped within the vehicle.

The above-mentioned security mode refers to a mode blocking an attempt to remotely manipulate the vehicle via the near-field communication terminal 300. For example, remote attempts to unlock a door of the vehicle 100, unlock a trunk door, and start the vehicle are blocked.

The registered mobile communication terminals 200 may be provided in plural, and the vehicle 100 may activate the security mode upon receiving remote movement notifications from all of the registered mobile communication terminals 200.

When the vehicle 100 activates the security mode, remote vehicle operations such as those of a toggle button/start button on a door handle via the near-field communication terminal 300 are blocked.

The manipulation of the vehicle 100 may denote possession of the near-field communication terminal 300, or all actions that manipulate the vehicle 100 including trying to open a vehicle door through touch/press of a door handle button, trying to open a trunk, and attempting remote start via the near-field communication terminal 300.

Figure 5:
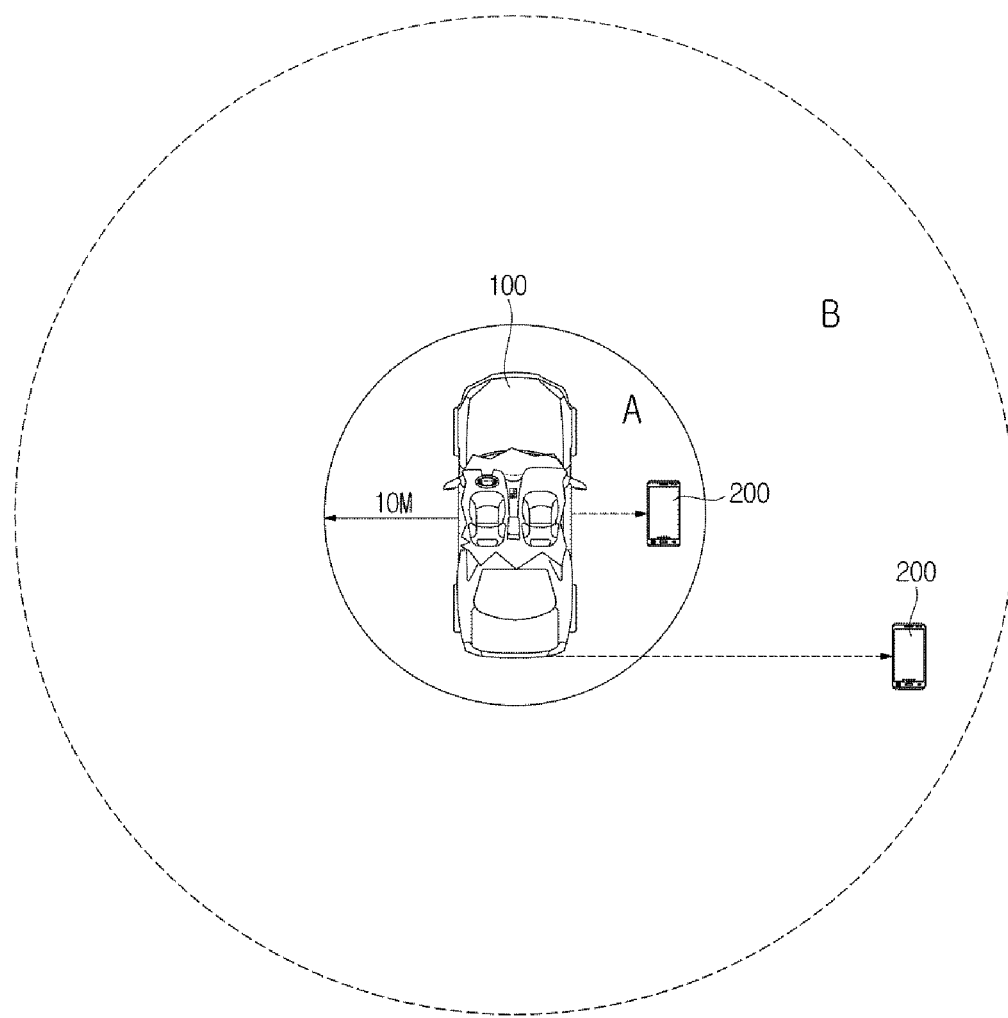
FIG. 5 is a view illustrating a vehicle security method according to embodiments of the present disclosure.

Referring to FIG. 5, when the mobile communication terminal 200 receiving the vehicle GPS information from the vehicle 100 moves beyond a predetermined distance (for example, 10 m) (area A→area B), the remote movement notification is transmitted to the vehicle 100. Herein, the area A refers to an area where normal operations of the vehicle via the near-field communication terminal 300 are available, and the area B refers to an area where normal operations of the vehicle via the near-field communication terminal 300 are not available.

When the mobile communication terminal 200 moves to a remote place, the vehicle 100 may block door unlock/start, NFC access/start, NFC signal searching, welcome light searching, smart trunk searching, and unnecessary load driving power functions in the vehicle. Herein, the welcome light searching refers to a function of turning on a light of the vehicle 100 when the vehicle 100 detects the approach of the near-field communication terminal 300. The smart trunk searching refers to a function of automatically opening the trunk door of the vehicle 100.

The above-described near-field communication terminal 300 refers to a terminal configured to perform manipulations of the vehicle 100 including door opening, trunk opening, and remote start of the vehicle 100, and may also be referred to as a smart key or a fob key, for example.

The vehicle 100 may block the manipulation of the vehicle 100 regardless of reception of an authentication response signal from the near-field communication terminal 300 when the security mode is kept activated. Herein, the authentication response signal refers to a response signal with respect to an authentication signal transmitted from the vehicle 100 to the near-field communication terminal 300 via an LF signal or RF signal.

In addition, when the security mode is activated, the vehicle 100 may activate a power block mode to block power to the predetermined components in the vehicle.

Specifically, when the power block mode is activated, the vehicle 100 may block power for detecting a communication signal between the mobile communication terminal 200 and the vehicle 100 and predetermined load driving power. For example, the vehicle 100 may block unnecessary load driving power via the near-field communication terminal 300 such as unlock/start, welcome light/smart trunk searching, NFC access/start, and NFC signal searching, but excluding power required for a door switch input signal, a telematics unit, and the mobile communication terminal.

The above-described welcome light/smart trunk function is a function to provide convenience by detecting approach of a user having the near-field communication terminal 300, in which power consumption occurs because the approach of the user is required to be detectable by the vehicle 100 for 24 hours a day.

In addition, when authentication technology is applied between the vehicle 100 and the user using an NFC scheme of a mobile communication terminal such as a smart phone, the approach of the user is required to be detected for 24 hours a day by searching for the NFC signal, thus causing power consumption.

Because detection of the approach of the user is meaningless when the user having the near-field communication terminal 300 or the mobile communication terminal 200 is located in a remote place, the vehicle 100 blocks the power required for a correspondence function, thereby minimizing power consumption.

When the attempt to manipulate the vehicle via the near-field communication terminal 300 occurs during the security mode, the vehicle 100 may transmit a vehicle theft alarm notification to the registered mobile communication terminal 200.

Hereinafter, the vehicle 100 deactivating the security mode will be described.

For example, upon receiving the proximity movement notification from the mobile communication terminal 200, the vehicle 100 may deactivate the security mode.

As another example, the vehicle 100 may transmit the authentication signal for the vehicle manipulation to the mobile communication terminal 200 when the attempt to manipulate the vehicle 100 via the near-field communication terminal 300 occurs, and may deactivate the security mode to allow vehicle manipulation when an intensity of an authentication response signal replied from the mobile communication terminal 200 is equal to or greater than a reference value.

When the intensity of the authentication response signal is less than the reference value, the vehicle 100 may keep the security mode activated to block vehicle manipulation.

As still another example, the vehicle 100 may compare GPS coordinates of the vehicle 100 with GPS coordinates of the mobile communication terminal 200 when the attempt to manipulate the vehicle 100 via the near-field communication terminal 300 occurs, may deactivate the security mode to allow vehicle manipulation when a separation distance between the vehicle 100 and the mobile communication terminal 200 is within a predetermined distance, and may keep the security mode activated to block vehicle manipulation when the separation distance exceeds the predetermined distance.

When the above-mentioned mobile communication terminal 200 is provided in plural, the vehicle 100 may perform a procedure for deactivating the security mode with all of the mobile communication terminals 200 individually.

The mobile communication terminal 200 may transmit a remote movement notification to the vehicle 100 when moving beyond the predetermined distance from the vehicle 100 based on vehicle GPS information.

The mobile communication terminal 200 may store the vehicle GPS information transmitted from the vehicle 100 so as to use the vehicle GPS information when calculating the separation distance from the vehicle 100.

Referring again to FIG. 5, when moving away from a location (based on vehicle GPS information) of the vehicle 100 by the predetermined distance or more (moving from the area A to the area B), the mobile communication terminal 200 may transmit the remote movement notification to the vehicle 100. Herein, the predetermined distance may be set arbitrarily according to the operator's need.

The mobile communication terminal 200 may transmit a proximity movement notification to the vehicle 100 when moving within the predetermined distance based on the vehicle GPS information. Accordingly, the vehicle 100 may perform an operation such as deactivating the security mode.

Referring again to FIG. 5, when moving from the area B to the area A, and when entering the predetermined distance from the location of the vehicle 100, the mobile communication terminal 200 may transmit the proximity movement notification to the vehicle 100.

The mobile communication terminal 200 may transmit the authentication response signal in response to the authentication signal transmitted from the vehicle 100, or may reply with the GPS coordinates of the mobile communication terminal 200 upon request of the vehicle 100.

To this end, the mobile communication terminal 200, of course, includes a GPS receiver (not shown).

Figure 4:
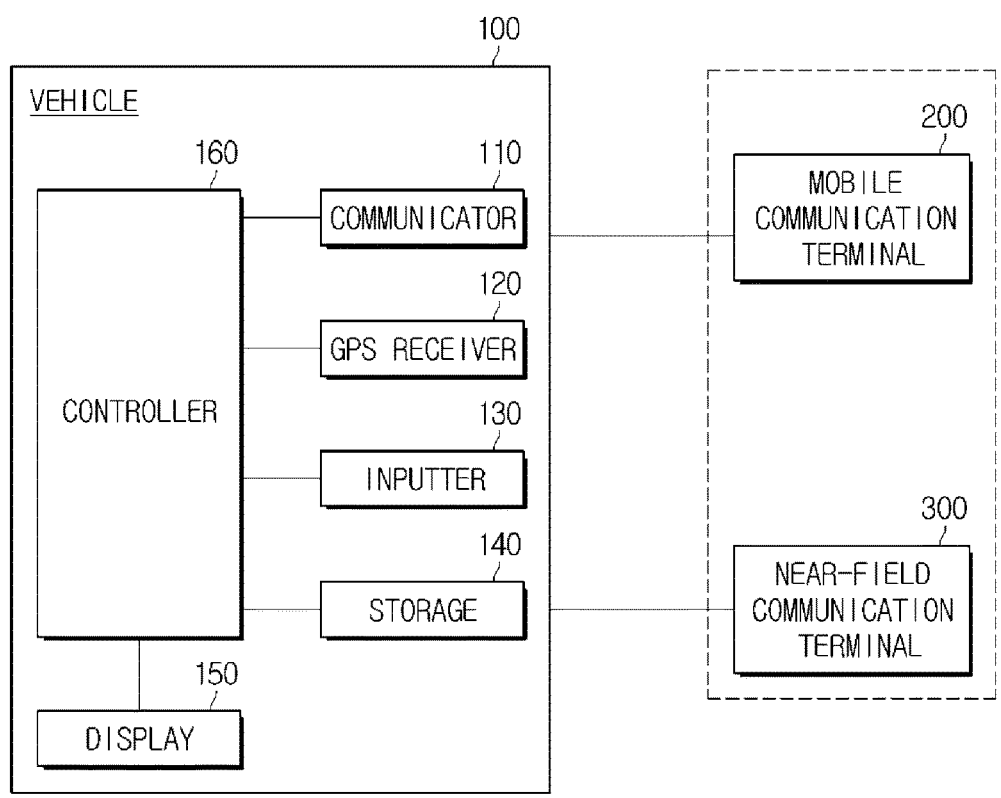
FIG. 4 is a control block diagram showing details of a configuration of a vehicle in a vehicle security system according to embodiments of the present disclosure.

FIG. 4 is a block diagram showing details of a configuration of a vehicle in a vehicle security system according to embodiments of the present disclosure.

A vehicle 100 disclosed hereinafter may implement all the above-mentioned functions of the vehicle 100 of FIG. 3, and repeated details will be omitted for the sake of convenience.

As shown in FIG. 4, the vehicle 100 may include a communicator 110, a GPS receiver 120, an inputter 130, a storage 140, a display 150, and a controller 160.

The communicator 110 is a component configured to perform communication with an external device including a mobile communication terminal 200 and a near-field communication terminal 300. For example, the communicator 110 may transmit an authentication signal to the mobile communication terminal 200 or the near-field communication terminal 300 through near-field communication such as an LF signal or an RF signal. Without being limited to the above, the communicator 110 may also transmit the authentication signal through a wireless communication method capable of longer-range communication compared with the near-field communication.

In addition, the communicator 110 may include at least one component enabling communication with the external device. For example, the communicator 110 may include at least one of a near-filed communication module, a wired communication module, and a wireless communication module.

The near-field communication module may include various near-field communication modules configured to transmit and receive signals using a wireless communication network at a short distance such as a Bluetooth module, an infrared communication module, a radio frequency identification (RFID) communication module, a wireless local access network (WLAN) communication module, an NFC communication module, and a ZigBee communication module.

The wired communication module may include various cable communication modules such as universal serial bus (USB), a high definition multimedia interface (HDMI), a digital visual interface (DVI), a recommended standard232 (RS-232) module, a power line communication module, and a plain old telephone service (POTS) module as well as various wired communication modules such as a controller area network (CAN) communication module, a local area network (LAN) module, a wide area network (WAN) module, and a value added network (VAN) module.

The wireless communication module may include wireless communication modules configured to support various wireless communication modes such as a global system for mobile communication (GSM), a code division multiple access (CDMA), a wideband code division multiple access (WCDMA), a universal mobile telecommunications system (UMTS), a time division multiple access (TDMA), a long term evolution (LTE) in addition to a radio data system-traffic message channel (RDS-TMC), a digital multimedia broadcasting (DMB), a WiFi module, and a Wireless broadband module.

The wireless communication module may include a wireless communication interface including an antenna and a receiver configured to receive traffic information signals. In addition, the wireless communication module may further include a traffic information signal conversion module configured to demodulate an analog type wireless signal received through the wireless communication interface into a digital control signal.

Meanwhile, the communicator 110 may further include an internal communication module (not shown) for communication between electronic devices inside the vehicle 100. A controller area network (CAN), a local interconnection network (LIN), a FlexRay, an Ethernet, or the like may be used as an internal communication protocol of the vehicle 100.

The global positioning system (GPS) receiver 120 is a component configured to acquire GPS information of the vehicle 100. The GPS information identified through the GPS receiver 120 may be transmitted to at least one mobile communication terminal 200 registered in the vehicle 100.

The inputter 130 may allow an owner of the vehicle 100 to register/delete a plurality of mobile communication terminals 200. Herein, the vehicle 100 and the mobile communication terminal 200 may store and manage information for identifying the user.

The inputter 130 may include various hardware-type devices such as a button, a switch, a pedal, a keyboard, a mouse, a track ball, a lever, a handle, and a stick for user input.

In addition, the inputter 130 may include a graphical user interface (GUI), that is, software based devices such as a touch pad for user input. The touch pad may be embodied as a touch screen panel (TSP), thereby forming a mutual layer structure with the display 150.

The storage 140 may be configured to store various information for controlling the vehicle 100 in addition to information of the registered mobile communication terminal 200.

The storage 140 may be implemented by at least one of a non-volatile memory device such as a cache, a read only memory (ROM), a programmable ROM (PROM), an erasable programmable ROM (EPROM), and an electrically erasable programmable ROM (EEPROM), a volatile memory device such as a random access memory (RAM), and a storage medium such as a hard disk drive (HDD), and a CD-ROM, but is not limited thereto.

The storage 140 may be a memory implemented in a chip separated from the above-described processor related to the controller 160, or may be implemented as a single chip integrated with the processor.

The display 150 may be a component configured to display various information related to the vehicle 100.

The display 150 may include a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, and an organic light emitting diode (OLED) panel, but is not limited thereto.

The controller 160 may transmit the vehicle GPS information to the registered mobile communication terminal 200 when power is switched off, and activate the security mode upon receiving the remote movement notification from the mobile communication terminal 200 so that the vehicle manipulation via the near-field communication terminal 300 can be blocked during the security mode;

When the security mode is activated, the controller 160 may activate a power block mode to block power to the predetermined components in the vehicle.

Figure 6:
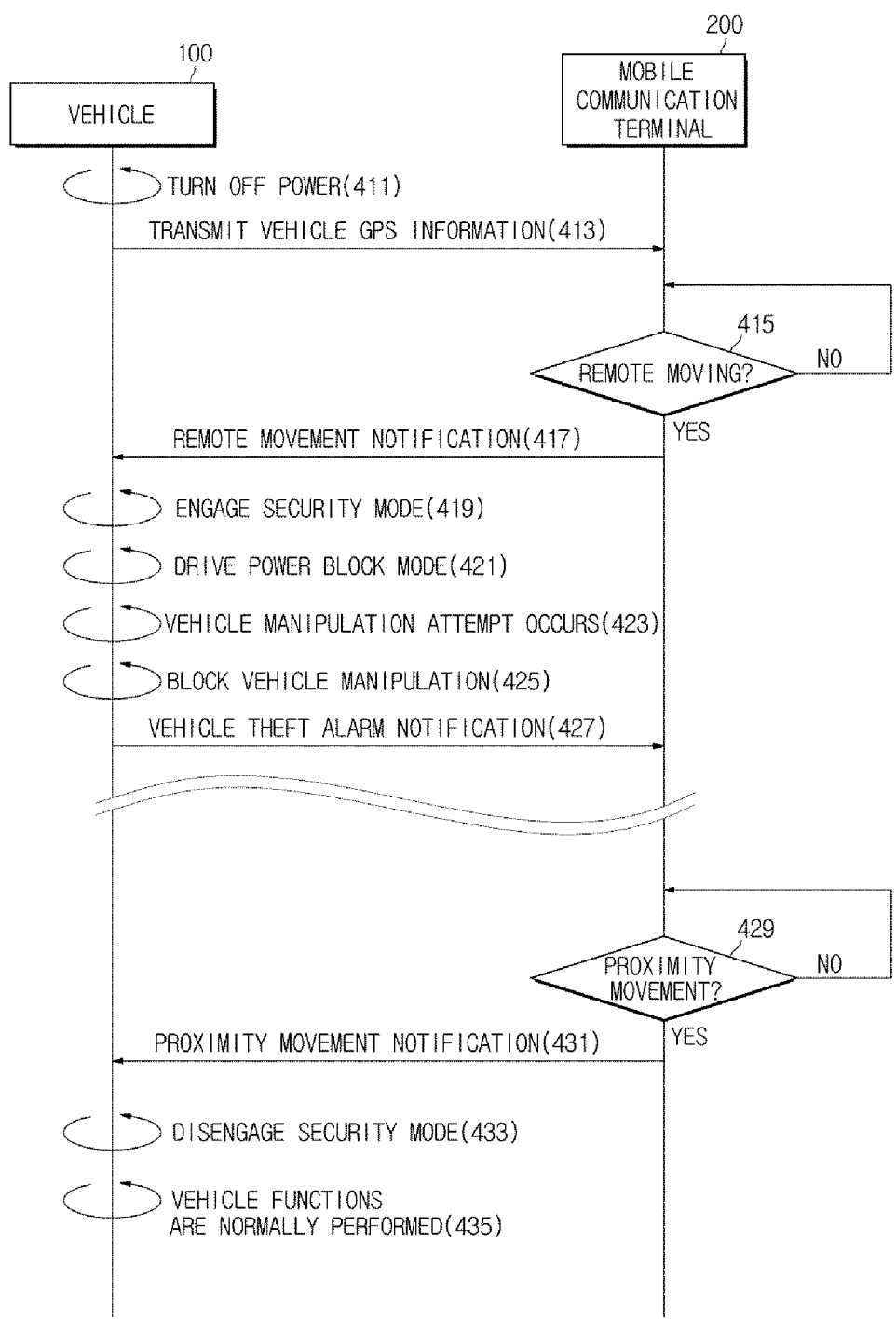
FIG. 6 is a flowchart for describing an example of a vehicle security method according to embodiments of the present disclosure.

FIG. 6 is a flowchart for describing an example of a vehicle security method according to embodiments of the present disclosure.

First, when the power of the vehicle 100 is turned off (411), a vehicle 100 may transmit vehicle GPS information to a registered mobile communication terminal 200 (413). Herein, the registered mobile communication terminals 200 may be provided in plural and the vehicle 100 may transmit the vehicle GPS information to all of the mobile communication terminals 200.

Next, when remotely moving beyond a predetermined distance from the vehicle 100 (415), the mobile communication terminal 200 may transmit a remote movement notification to the vehicle 100 based on the vehicle GPS information (417).

Next, upon receiving the remote movement notification transmitted from the mobile communication terminal 200, the vehicle 100 may activate a security mode (419).

The above-mentioned security mode refers to a mode blocking attempts to manipulate the vehicle via a near-field communication terminal 300. For example, attempts to unlock a door of the vehicle 100, unlock a trunk door, and start the vehicle are blocked.

In other words, when the vehicle 100 activates the security mode, vehicle operations such as those of a toggle button/start button on a door handle via the near-field communication terminal 300 are blocked.

Next, when the security mode is activated, the vehicle 100 may activate a power block mode to block power to predetermined components in the vehicle 100 (421).

When the power block mode is activated, the vehicle 100 may block power for detecting near-field communication signals of the near-field communication terminal 300 and the mobile communication terminal 200 and predetermined load driving power of the vehicle 100.

For example, the vehicle 100 may block unnecessary load driving power such as unload/start, welcome light/smart trunk searching, NFC access/start, and NFC signal searching via the near-field communication terminal 300, but excluding power required for a door switch input signal, a telematics unit, and the mobile communication terminal.

The above-described welcome light/smart trunk function serves to provide convenience by detecting approach of a user having the near-field communication terminal 300, in which power consumption occurs because the approach of the user is required to be detectable by the vehicle 100 for 24 hours a day.

In addition, when authentication technology is applied between the vehicle 100 and the user using an NFC scheme of a mobile communication terminal such as a smart phone, the approach of the user is required to be detectable for 24 hours a day by searching for the NFC signal, thus causing power consumption.

Because detecting the approach of the user is meaningless when the user having the near-field communication terminal 300 or the mobile communication terminal 200 is located in a remote place, the vehicle 100 blocks the power required for a correspondence function, thereby minimizing power consumption.

Next, when the manipulation of the vehicle 100 via the near-field communication terminal 300 is attempted when the security mode is kept activated (423), the vehicle 100 may block the manipulation (425).

The manipulation of the vehicle 100 may denote possession of the near-field communication terminal 300, or all actions that manipulate the vehicle 100 including trying to open a vehicle door through touching/pressing a door handle button, trying to open a trunk, and attempting remote start using the near-field communication terminal 300.

Next, the vehicle 100 may transmit a vehicle theft alarm notification to the registered mobile communication terminal 200 (427).

The mobile communication terminal 200 may transmit a proximity movement notification to the vehicle 100 when moving within a predetermined distance based on vehicle GPS information (429, 431).

The vehicle 100 may deactivate the security mode upon receiving the proximity movement notification from the mobile communication terminal 200 (433), and the vehicle functions blocked during the security mode may be normally performed (435).

FIG. 7 is a flowchart for describing another example of a vehicle security method according to embodiments of the present disclosure.

First, when power of the vehicle 100 is switched off (511), a vehicle 100 may transmit vehicle GPS information to a registered mobile communication terminal 200 (513).

Next, when moving beyond a predetermined distance from the vehicle 100 (515), the mobile communication terminal 200 may transmit a remote movement notification to the vehicle 100 based on the vehicle GPS information (517).

Next, the vehicle 100 may activate a security mode upon receiving the remote movement notification transmitted from the mobile communication terminal (519).

Next, when the security mode is activated, the vehicle 100 may activate a power block mode to block power to predetermined components in the vehicle 100 (521).

When the power block mode is activated, the vehicle 100 may block power for detecting near-field communication signals of the near-field communication terminal 300 and the mobile communication terminal 200 and predetermined load driving power of the vehicle 100.

When manipulation of the vehicle 100 via the near-field communication terminal 300 occurs during the security mode (523), the vehicle 100 may check for proximity movement of the mobile communication terminal 200 and block the manipulation of the vehicle according to the result of the check (525 to 529).

For example, when an attempt to manipulate the vehicle 100 via the near-field communication terminal 300 occurs, the vehicle 100 may transmit an authentication signal for vehicle manipulation to the mobile communication terminal 200.

Next, upon receiving an authentication response signal replied from the mobile communication terminal 200, the vehicle 100 may confirm whether the intensity of the authentication response signal is equal to or greater than a reference value.

When, as a result of the confirmation, the intensity of the authentication response signal is less than the reference value, the vehicle 100 may block vehicle manipulation.

As another example, when the attempt to manipulate the vehicle via the near-field communication terminal occurs, the vehicle 100 may compare GPS coordinates of the vehicle with GPS coordinates of the mobile communication terminal.

As a result of the comparison, when a separation distance between the vehicle 100 and the mobile communication terminal 200 exceeds a predetermined distance, the vehicle 100 may keep the security mode activated so that the vehicle manipulation can be blocked.

Next, the vehicle 100 may transmit a vehicle theft alarm notification to the registered mobile communication terminal 200 (531).

Meanwhile, as a result of step 527, when the mobile communication terminal 200 moves nearby, the vehicle 100 may deactivate the security mode (533) and normally perform the vehicle functions blocked during the security mode (535).

Herein, the proximity movement of the mobile communication terminal 200 may mean that the intensity of the above-mentioned authentication response signal is equal to or greater than the reference value, or the separation distance between the vehicle 100 and the mobile communication terminal 200 is within the predetermined distance.

The above-mentioned controller 160 may be implemented by a memory (not shown) configured to store an algorithm configured to control operations of components in the vehicle 100 or data for a program reproducing the algorithm, and by a processor (not shown) configured to perform the above-mentioned operations using the data stored in the memory. Herein, the memory and the processor may be implemented as separate chips. Alternately, the memory and the processor may be implemented as a single chip integrated with each other.

Meanwhile, the embodiments disclosed herein may be implemented in the form of a recording medium configured to store instructions executable by a computer. The instructions may be stored in the form of program code, and perform the operations of the disclosed embodiments by creating a program module when executed by the processor. The recording medium may be implemented as a computer-readable recording medium. The computer-readable recording medium includes all kinds of recording media stored therein with instructions which can be decoded by the computer, such as a read only memory (ROM), a random access memory (RAM), a magnetic tape, a magnetic disk, a flash memory, and an optical data storage.

As is apparent from the above description, a vehicle activates a security mode using GPS information of the vehicle and a mobile communication terminal, and remote manipulation attempts to the vehicle are blocked during the security mode so that vehicle theft as well as theft of articles inside the vehicle can be prevented. As is further apparent from the above description, unnecessary power of a vehicle is blocked when a driver moves away from the vehicle so that battery-saving technology can be implemented.

The disclosed embodiments have been described with reference to the accompanying drawings. It will be understood by an ordinary person skilled in the art to which the present disclosure pertains that the present disclosure may be carried out in other forms than the disclosed embodiments without changing the technical spirit or the essential features. The disclosed embodiments are exemplary and should not be construed in a restrictive way.

What is claimed is:

1. A vehicle security system comprising:
a plurality of mobile communication terminals; and
a vehicle configured to transmit vehicle global positioning system (GPS) information to the plurality of mobile communication terminals when an ignition of the vehicle is switched off, activate a security mode when a remote movement notification is received from each of the plurality of mobile communication terminals, and block remote vehicle manipulation via a near-field communication terminal when the security mode is activated, wherein
the plurality of mobile communication terminals are registered with the vehicle through an inputter of the vehicle and are configured to determine a location of the vehicle based on the vehicle GPS information, and transmit the remote movement notification to the vehicle when each of the plurality of mobile communication terminals moves beyond a predetermined distance from the location of the vehicle,
the inputter is configured to allow a user to register the plurality of mobile communication terminals, and
the vehicle is configured to deactivate the security mode when each of the plurality of mobile communication terminals satisfies a predetermined condition for deactivating the security mode.

2. The vehicle security system according to claim 1, wherein, when the vehicle receives an authentication response signal from the near-field communication terminal, the vehicle continues to block the remote vehicle manipulation when the security mode is activated.

3. The vehicle security system according to claim 1, wherein, when the security mode is activated, the vehicle activates a power block mode to block power to one or more predetermined components in the vehicle.

4. The vehicle security system according to claim 3, wherein, when the power block mode is activated, the vehicle blocks power for detecting near-field communication signals transmitted from the near-field communication terminal and the plurality of mobile communication terminals.

5. The vehicle security system according to claim 1, wherein, when an attempt to manipulate the vehicle via the near-field communication terminal occurs during activation of the security mode, the vehicle transmits a vehicle theft alarm notification to each of the plurality of mobile communication terminals.

6. The vehicle security system according to claim 1, wherein the vehicle deactivates the security mode upon receiving a proximity movement notification from each of the plurality of mobile communication terminals.

7. The vehicle security system according to claim 1, wherein the vehicle is further configured to:
transmit an authentication signal for remote manipulation of the vehicle to each of the plurality of mobile communication terminals when an attempt to manipulate the vehicle via the near-field communication terminal occurs;
deactivate the security mode to allow the remote manipulation of the vehicle when an intensity of an authentication response signal received from each of the plurality of mobile communication terminals is greater than or equal to a reference value; and
block the remote manipulation of the vehicle by keeping the security mode activated when the intensity of the authentication response signal is less than the reference value.

8. The vehicle security system according to claim 1, wherein the vehicle is further configured to:
compare GPS coordinates of the vehicle with respective GPS coordinates of each of the plurality of mobile communication terminals, respectively, when an attempt to remotely manipulate the vehicle via the near-field communication terminal occurs;
deactivate the security mode to allow remote vehicle manipulation when respective distances between the vehicle and each of the plurality of mobile communication terminals are less than a predetermined distance; and
block the remote vehicle manipulation by keeping the security mode activated when the respective distances between the vehicle and each of the plurality of mobile communication terminals exceed the predetermined distance.

9. The vehicle security system according to claim 1, wherein the near-field communication terminal is configured to perform remote vehicle manipulation of the vehicle including at least one of door opening, trunk opening, and a remote start of the vehicle.

10. A vehicle comprising:
a communicator;
a GPS receiver configured to acquire vehicle GPS information of the vehicle;
an inputter configured to allow a user to register a plurality of mobile communication terminals; and
a controller configured to transmit the vehicle GPS information to the plurality of mobile communication terminals registered through the inputter when an ignition of the vehicle is switched off, activate a security mode when a remote movement notification is received from each of the plurality of mobile communication terminals, and block remote vehicle manipulation via a near-field communication terminal when the security mode is activated,
wherein the controller is configured to deactivate the security mode when each of the plurality of mobile communication terminals satisfies a predetermined condition for deactivating the security mode.

11. The vehicle according to claim 10, wherein, when the security mode is activated, the controller activates a power block mode to block power to one or more predetermined components in the vehicle.

12. A vehicle security method comprising:
transmitting, by a vehicle, vehicle GPS information to a plurality of mobile communication terminals registered through an inputter of the vehicle when an ignition of the vehicle is switched off;
activating, by the vehicle, a security mode when the vehicle receives a remote movement notification from each of the plurality of mobile communication terminal;
blocking, by the vehicle, remote manipulation of the vehicle via a near-field communication terminal when the security mode is activated; and
deactivating, by the vehicle, the security mode when each of the plurality of mobile communication terminals satisfies a predetermined condition for deactivating the security mode,
wherein the inputter is configured to allow a user to register the plurality of mobile communication terminals.

13. The vehicle security method according to claim 12, further comprising activating a power block mode to block power to one or more predetermined components in the vehicle when the security mode is activating, after activating the security mode and before blocking the remote manipulation of the vehicle.

14. The vehicle security method according to claim 13, wherein, when the power block mode is activated, power for detecting near-field communication signals transmitted from the near-field communication terminal and the plurality of mobile communication terminals are blocked.

15. The vehicle security method according to claim 12, further comprising transmitting a vehicle theft alarm notification to each of the plurality of mobile communication terminals after blocking the remote manipulation of the vehicle.

16. The vehicle security method according to claim 12, further comprising deactivating the security mode upon receiving a proximity movement notification from each of the plurality of mobile communication terminals after activating the security mode.

17. The vehicle security method according to claim 12, wherein the blocking of the remote manipulation of the vehicle comprises:
transmitting, by the vehicle, an authentication signal for remote manipulation of the vehicle to each of the plurality of mobile communication terminals when an attempt to remote manipulate the vehicle via the near-field communication terminal occurs;
determining whether an intensity of an authentication response signal is greater than or equal to a reference value, the authentication response signal received from each of the plurality of mobile communication terminals; and
blocking the remote manipulation of the vehicle when the intensity of the authentication response signal is less than the reference value.

18. The vehicle security method according to claim 12, wherein the blocking of the remote manipulation of the vehicle comprises:
comparing, by the vehicle, GPS coordinates of the vehicle with respective GPS coordinates of each of the plurality of mobile communication terminals when an attempt to remotely manipulate the vehicle via the near-field communication terminal occurs; and blocking the remote manipulation of the vehicle by keeping the security mode activating when respective distances between the vehicle and each of the plurality of mobile communication terminals exceed a predetermined distance.

* * * * *